April 18, 1961 R. J. HARKENRIDER 2,980,471
LUBRICATING WICK AND METHOD OF MAKING SAME
Filed April 10, 1959 3 Sheets-Sheet 1

Inventor
Robert J. Harkenrider
By Mann, Brown, & McWilliams
Attys.

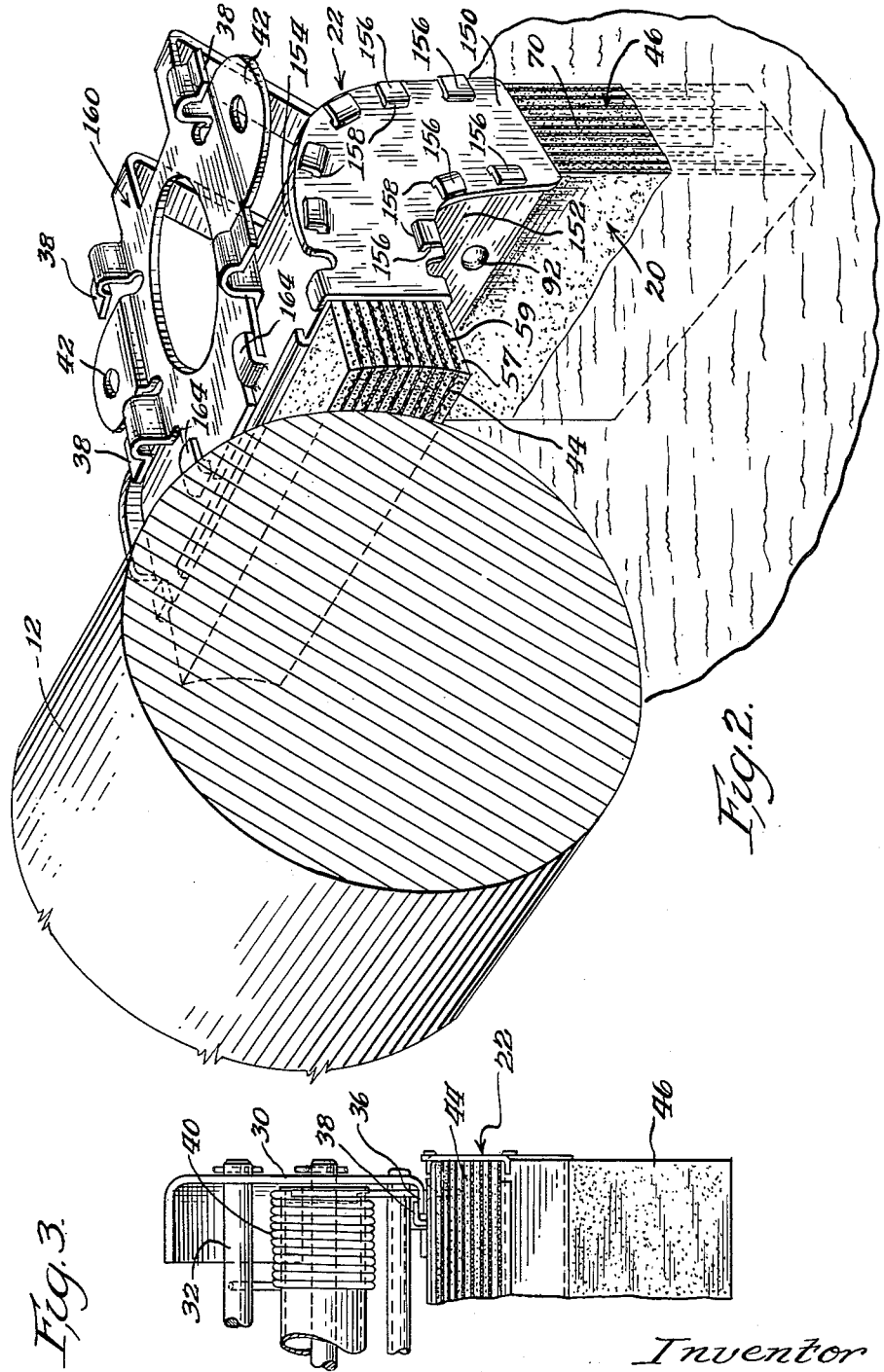

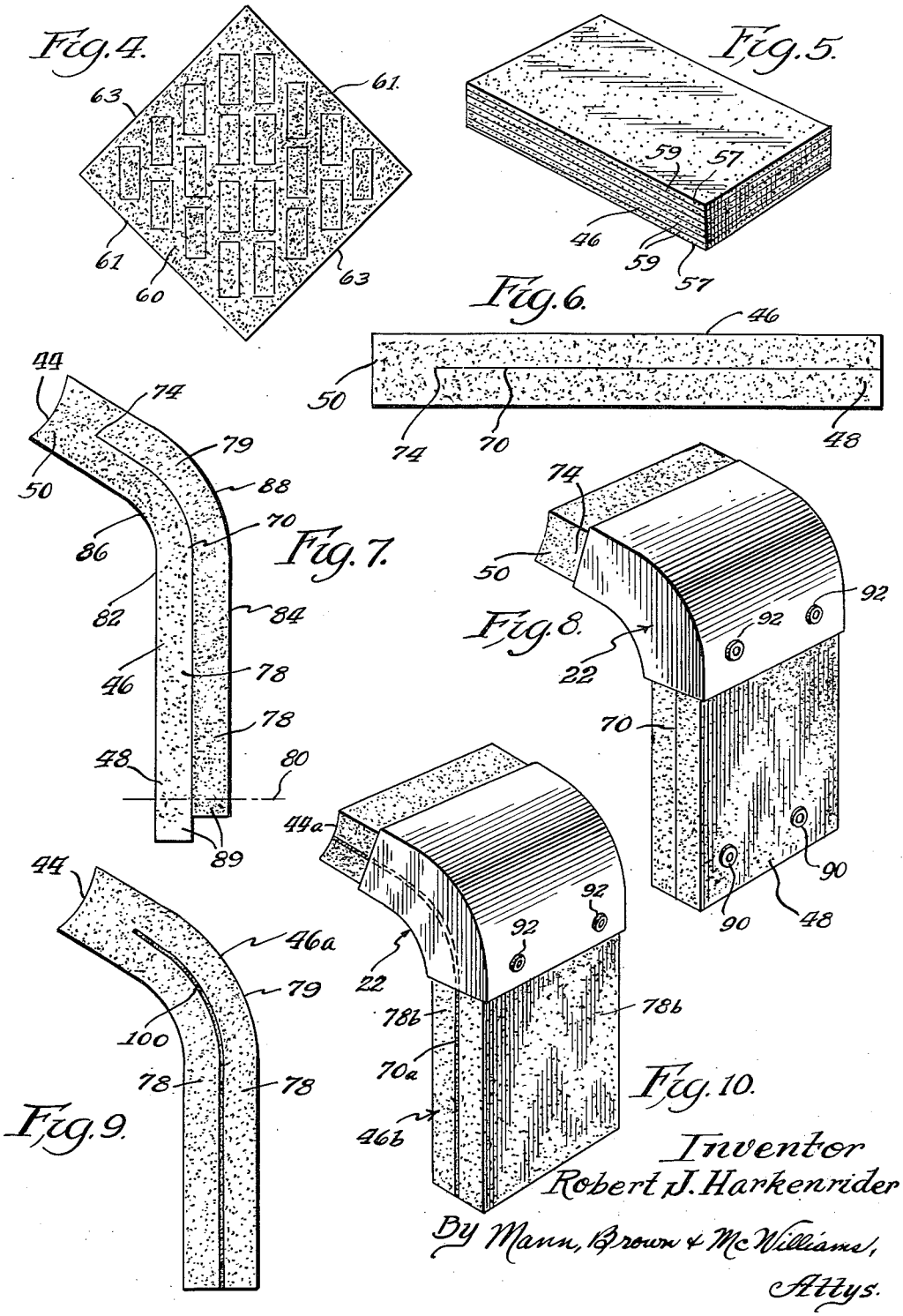

United States Patent Office 2,980,471
Patented Apr. 18, 1961

2,980,471
LUBRICATING WICK AND METHOD OF MAKING SAME

Robert J. Harkenrider, Winona, Minn., assignor to Gladys D. Miller, Winona, Minn.

Filed Apr. 10, 1959, Ser. No. 805,407
5 Claims. (Cl. 308—132)

My invention relates to a lubricating wick and method of making same, and more particularly, to a simplified lubricating wick adapted for use in the axle cap of diesel locomotive traction motor suspension bearings.

Lubricators of the type to which my invention relates employ a lubricating wick that lifts, by capillary action, lubricant from the oil chamber of the axle cap and applies it to the axle journal through a window opening formed in the bearing assembly at one side thereof.

Lubricating wicks for lubricators of this type have in the past been in the form of a felt body provided with a thickened upper portion formed with an arcuate surface which is complementary to that of the journal that it engages and a depending projection that extends from the thickened portion into the oil reservoir of the axle cap to supply the oil to the thickened portion. See, for instance, my Patent No. 2,708,611, granted May 17, 1955.

Such bodies are conventionally made by individually stamping them out of felt sheeting. Due to the irregular shapes of these bodies, the dies employed must in turn be rather complicated in shape and resulting felt wastage high. Furthermore, the thickened upper portions require a relatively large window opening in the bearing assembly, with consequent reduced bearing surface in contact with the journal.

A principal object of my invention is to provide a simplified lubricating wick that eliminates the need for complicated forming dies and undesirable wastage of the expensive felt material.

A further principal object of the invention is to provide a method of making lubricating wicks which reduces manufacturing operations to several simplified and inexpensively performed steps.

Yet another object of my invention is to provide a lubricating wick which is of relatively narrow dimension vertically of the bearing assembly window through which it is to extend, which permits window openings of reduced size with consequent increase of bearing surface.

Still another object of the invention is to provide a lubricating body of simplified design which is efficient in use and adapted for a wide variety of applications.

Other objects, uses and advantages will be obvious or become apparent upon a consideration of the following detailed description and the application drawings.

In the drawings:

Figure 2 is a diagrammatic perspective view of the lubricating body shown in Figure 1 as received in its holder member and applied to the axle;

Figure 3 is a fragmental elevational view of the lubricator assembly shown in Figure 1, as viewed from the side of the axle to be lubricated;

Figure 4 is a plan view of a piece of felt sheeting or blank from which lubricating bodies are formed in accordance with my invention;

Figure 5 is a perspective view of a lubricating body as formed from the blank of Figure 4 by an appropriate die forming operation;

Figures 6 and 7 illustrate several consecutive steps in the processing of one form of lubricating body in accordance with my invention;

Figure 8 shows the lubricating body of Figures 6 and 7 applied to the holder member of Figure 1, the latter being shown in block diagram form only;

Figure 9 is a view similar to that of Figure 7, but illustrating a modified lubricating body in accordance with my invention; and Figure 10 illustrates a further form of lubricating body applied to the holder member of Figure 8.

*General description*

Figure 1:
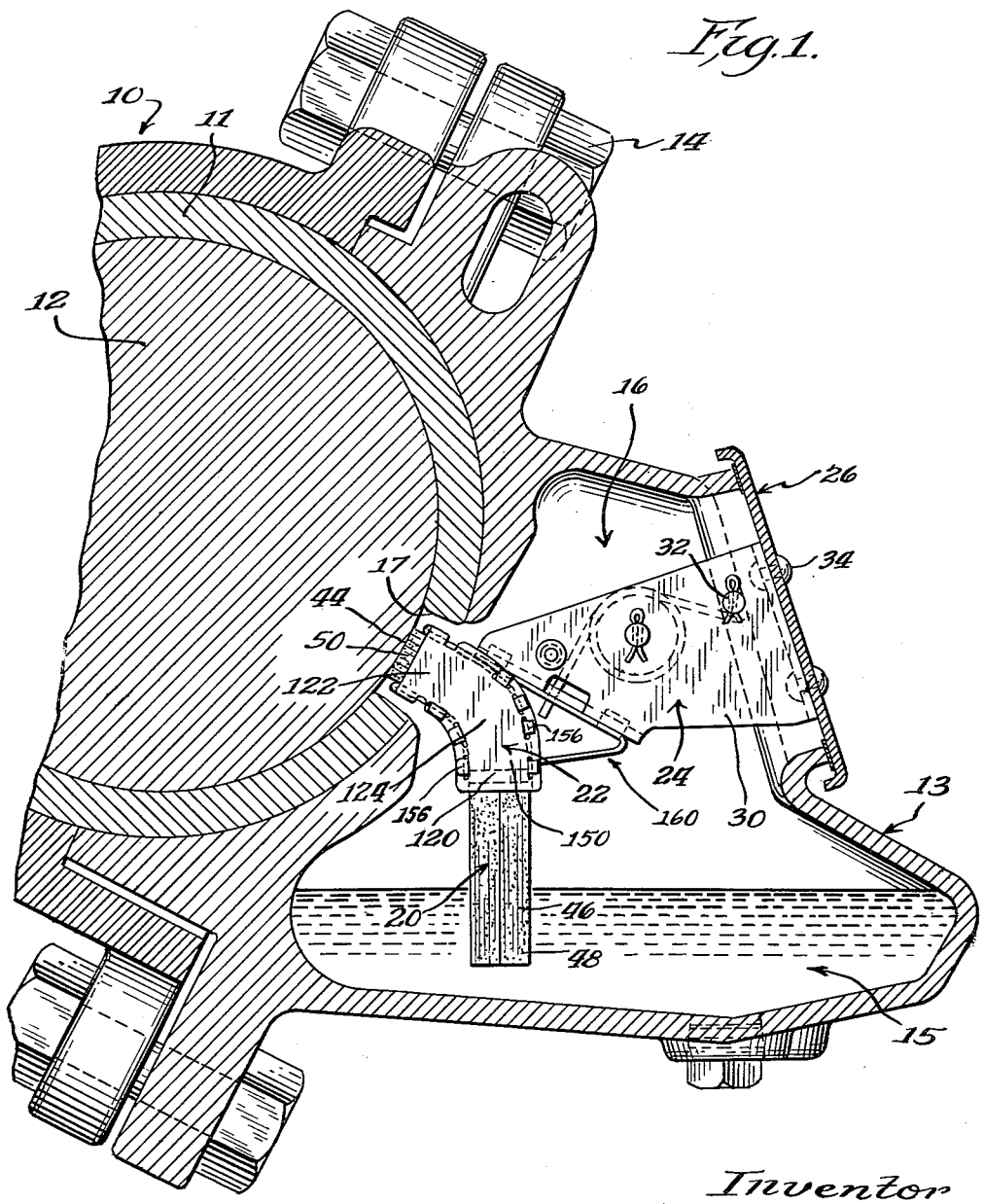
Figure 1 is a transverse vertical section through a motor suspension bearing and the axle to which the bearing is applied, showing in elevation a lubricator assembly employing one embodiment of my invention.

Reference numeral 10 of Figure 1 generally indicates a familiar form of traction motor suspension bearing provided with a liner or shell 11 forming the actual bearing for the wheel axle 12. Associated with these is a motor suspension bearing cap or axle cap 13 secured to the motor suspension bearing by bolts 14 and provided with an oil reservoir 15.

The lubricator assembly generally indicated at 16 is employed to lift oil from the reservoir 15 and apply it to the axle 12 through the window opening 17 in the shell or liner 11.

The lubricating assembly 16 comprises a lubricating wick or body 20 received in a tubular housing, trough or holder member 22 that is suspended from a carrier assembly 24 which is in turn secured to the cover 26 of the axle cap.

The specifics of the carrier assembly 24 are fully disclosed in my copending application Serial No. 805,408, filed April 10, 1959, the disclosure of which is hereby incorporated by reference in interests of brevity. Generally speaking, however, the carrier assembly comprises a pair of spaced brackets or side members 30 fixed to the axle cap cover plate by appropriate rivets 34 (cover plate 26 is customarily secured in place by appropriate bolts that are not shown). The brackets or side members 30 are formed with wings or tracks 36 (see Figure 3) that slidably engage the respective pairs of fingers 38 (see Figure 2) forming a part of the holder member 22.

The holder member 22 is biased in the direction of window opening 17 by appropriate torsion springs 40, one on each side of the lubricating assembly, the holder member being formed with wings 42 to receive one end of each spring and the other end of each spring bearing against a spring pin 32 secured between side members 30.

The lubricating body 20 is formed with an arcuate applicator surface 44 that is made complementary to the external surface of axle 12 which it is pressed against by the springs 40.

The lubricating body 20 of the present invention is formed from a block-like body 46 (see Figure 5) which is bent to the configuration of Figure 1 so that one end 48 thereof will depend into the oil reservoir 15 and the other end 50 will be positioned in the window opening 17.

Figures 9 and 10 illustrate modified lubricating bodies 46a and 46b that may be employed in place of the body 20 of Figure 1.

*Specific description*

The block-like bodies 46 from which lubricating bodies 20 are formed may be stamped from a blank 60 (see Figure 4) in the form of felt sheeting which may be of any conventional type, but which preferably is of the type employing alternate layers 57 and 59 of felt and woven fabric comprised of high capillary action strands in the form of a plain basket weave, such as that employed in making one form of lubricating body disclosed in my said Patent No. 2,708,611. The felt and the fabric of such a sheeting are pressed together so that the sheeting is a unitary mass held together by the felt fibers felting together through the mesh of the fabric material. The blocks or bodies are of generally parallelepiped configurations having rectangular transverse cross-sectional configurations in which the maximum dimension of the latter is to extend parallel to the journal (see Figure 2).

Prior to the operation that results in the formation of blocks or bodies 46, the blank 60 is oriented so that the blocks or bodies 46 are formed with the woven fabric cut on a bias of substantially 45 degrees with respect to the warp and woof threads forming the woven fabrics. As disclosed in my Patent No. 2,768,035, this positioning leaves no warp or woof threads of the woven fabric parallel to, or substantially parallel to, the end of the block or body that is to contact the axle 16. For purposes of this disclosure, it is assumed that the warp threads of the high lift fabric extend parallel to sides 61 of the blank, while the woof threads extend parallel to the blank sides 63.

As indicated in Figure 4, a plurality of blocks or bodies may be formed from a single blank 60 with substantially the positioning illustrated, though it is to be understood that any desired stamping or other forming arrangement may be employed which will effect the most efficient use of the laminated felt material forming the blank 60.

In accordance with one embodiment of my invention, the block or body 46 that forms a lubricating body 20 is further processed by being slit or cut as at 70 (see Figures 6 and 7) which cut is made parallel to the alternate layers of felt and woven fabric and approximately at the center of the body. In this embodiment of the invention, the slit or cut 70 extends from one end 48 of the block or body 46 to a point 74 spaced from the other end 50 of the block or body.

The block or body is then bent to the desired curvature as dictated by the assembly arrangement shown in Figure 1 and the ends of the two laminations or layers 78 formed by the slit or cut 70 cut off approximately along line 80 to even up end 48 of the body 46. The body 46 is so bent that the wide sides 82 and 84 are formed to define concave and convex surfaces 86 and 88, respectively, and it will be noted that, laterally of the body 46, laminations or layers 78 extend longitudinally of the axis of axle 12, and thus longitudinally of the axis of curved or arcuate portion 79 of the block or body.

The formation of the cut or slit 70 in the block or body 46 makes it possible to bend the block or body 46 to curvatures over angles in excess of 30 degrees on a relatively short radius without adversely affecting the capillary characteristics of the lubricating body since extreme tensioning of the felt fibers on the convex side of the body and extreme compacting of the felt fibers on the concave side of the body is avoided. The bending or curving of uncut or unslit bodies 46 as specified above will effect the extreme tensioning and compacting of the felt fibers above referred to which tests have showed tend to destroy the continuity of the capillary structure of the wicking material at the sides 82 and 84 of body 46. The result is that the lubricating body 46, when cut or slit and bent as illustrated, will effectively raise oil to the axle 12 in much the same mnner as it would if it were unbent before application to the window 16, since the dividing of the body, over the portion thereof that is to be curved into physically separate laminations provides relatively thin layers that will bend without setting up the undesirable conditions mentioned above.

The bending of the block or body 46 effects a displacement of laminations or layers 78 longitudinally of the block or body as indicated in Figure 7, because of the greater radius on the convex side of the body, and the resulting uneven ends 89 are trimmed to provide a uniformly shaped body.

The embodiment of Figures 6–8 may then be applied to holder member 22 as indicated in Figure 8 (wherein holder member 22 is shown only diagrammatically), holder 22 being proportioned to snugly engage body 46 and hold it at the desired degree of curvature. The two laminations or layers 78 are secured together (to hold them in place) at the lower end of the body by spaced rivets 90; also, spaced rivets 92 extend between opposite sides of the holder 22 and through the laminations or layers 78. It has been found convenient to insert the block or body 46 in holder 22 to initially provide the bending desired; while this facilitates the processing of the lubricator, the curvature desired may be formed in any suitable manner.

Arcuate surface 44 may be formed at any convenient point in the manufacturing process, as may the trimming of ends 89.

In the embodiment of Figure 9, the laminations or layers 78 are bonded together by a layer of lubricant resistant adhesive 100 which may be of any suitable type, such as that made and sold under the trademark Hycar by B. F. Goodrich Chemical Company of Akron, Ohio. The resulting body or block 46a is shaped to the desired contour after the adhesive is applied but before it sets.

When the body or block 46a is applied to holder 22, the rivets 90 may be eliminated, though rivets 92 are preferably applied as in the embodiment of Figure 8. Holder 22 may serve as a mold in which the body or block is inserted before adhesive 100 sets, whereby the desired curvature is automatically obtained.

In the embodiment of Figure 10, the lubricating body 46b is formed in much the same manner as indicated in Figures 6 and 7, except that the cut or slit 70a extends the entire length of the lubricating body. Prior to the bending and trimming of the lubricating body of Figure 10, a suitable lubricant resistant adhesive, such as that specified above, is applied between the two laminations or layers 78b, and before the adhesive sets or hardens, the body is bent, as by being inserted in holder 22, and trimmed (as described above). Arcuate applicator surface 44a may be formed in any suitable manner.

The holder member 22 is more particularly described in my said copending application Serial No. 805,408, but as indicated in Figures 1 and 2, it comprises a pair of side members 150 secured to arcuate bottom and top members 152 and 154, respectively, by tabs 156 integral with these latter members and extending through suitable perforations 158 formed in the side members.

The fingers 38 and wings 42 form a part of a slide member 160 that is secured to holder member 22 by tabs 164 and the rivets 92.

The alternate layers of felt 57 and woven fabric 59 will extend parallel to the axis of the journal 12 as indicated in Figure 2, which effects a continuous wiping action on the journal along the width of the lubricating body in accordance with the invention described in my said U.S. Patent No. 2,768,035.

In successful embodiments of the invention, the blocks or bodies 46, 46a and 46b are approximately eight inches long, four inches wide and one inch thick. Body 46 is cut or slit to within approximately 1½ inches of surface 44. Blanks 60 are approximately 37 by 42 inches and provide twenty blocks or bodies from each blank. The blocks or bodies are bent over an angle of sixty degrees on a radius measuring one inch at the concave side of the body. Holder 22 inches rectilinear portions 120 and 122 (on the order of ¾ inch long) on either side of curvilinear portion 124 to provide an improved restraining action on the lubricating bodies. End 50 of the lubricating body should project outwardly of the holder 22 on the order of ½ inch and end 48 should be sufficiently long to depend into the body of lubricant in reservoir 15. Surface 44 is struck on a radius of 4½ inches, which is the radius of the journal 12 to which these embodiments are applied.

However, the dimensions of the blocks or bodies may be varied to suit varying installation requirements, and the specific dimensions mentioned are given as exemplary only.

Blocks or bodies 46 alternately may be formed from elongate strips of felt (cut from felt sheeting to the width of bodies 46), which strips may be formed (in any suitable manner) for instance, from blank 60, or other suitable sheetings, and then processed as described above from the form suggested by Figure 5. This reduces wastage of the felt material to a minimum. Where the felt material contains the high capillary lift fabric described above, the sheeting should be so disposed when cut that the warp and woof strands of the high lift fabric are properly oriented (in the manner described above).

It will thus be seen that I have provided a simplified lubricating body which permits the use of inexpensively made die structures and avoids unnecessary wastage of the felt material. Furthermore, the end 50 of lubricating body as indicated in Figure 12, is of minimum dimension vertically of window opening 16, which permits the window opening 16 to be of minimum height thereby materially increasing the available bearing surface of liner 11. Also, smaller bearings may be employed where design considerations call for this.

Lubricating bodies of the types described in my said Patent No. 2,708,611 are customarily used in groups due to the commercial difficulty of making a single felt pad having sufficient applicator surface to cover the surface of the journal exposed in the window opening. This necessarily results in the existance of joints between felt bodies that extend transversely of the journal, where the lubricant supplied is frequently well below desirable standards. The lubricators herein disclosed eliminate these joints and insure a uniform lubricant applicator action along the journal surface contacted by the lubricators.

The terms "layer," "layers," "lamination," "laminations" and the like that are employed in the appended claims mean the layers or laminations formed by the cutting or slitting of the lubricator body and not the layers or laminations 57 and 59, unless the latter are specifically mentioned.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A lubricator comprising an elongate body of felt material of generally rectangular cross-sectional configuration and a tubular arcuate holder member through which said body extends, said holder member closely engaging said body and being received about an arcuate portion in said body, said holder member and said body curving to define concave and convex surfaces in the respective wide sides of said body, said body from one end thereof through said curved portion being bisected along the maximum dimension of said cross-sectional configuration to define said body into layers extending longitudinally of said body, said layers being longitudinally displaceable with respect to each other when said curved portion is formed, and means for securing said layers together in displaced relation.

2. The method of forming a lubricator pad from a blank of laminated felt sheeting including woven fabric sheets interposed between layers of felt, with the warp and woof strands of said fabric sheets extending in the same directions, respectively, said method including cutting a block of material from said sheeting when oriented at a bias of substantially 45 degrees with respect to said warp and woof strands, slitting said block lengthwise thereof from one end thereof a substantial distance along its midportion and parallel to said fabric sheets, forming at least a part of the slit portion of said block to define a smoothly curving arc, and securing the slit portions together.

3. The method set forth in claim 2 wherein said slit portions are trimmed even at said one end of said block.

4. A lubricator comprising an elongate body of capillary material of generally rectangular cross-sectional configuration, said body being formed with an arcuate portion curving to define convex and concave surfaces in the respective wide sides of said body, said body from one end thereof through said arcuate portion being divided along the maximum dimension of said cross-sectional configuration to define said body into layers extending longitudinally of the body, and means for holding said arcuate portion to its arcuate shape after said arcuate portion is formed, said means comprising a rigid arcuate tubular member in which said body is received.

5. The method of making a lubricator pad from a blank of felt sheeting material provided with a multitude of generally parallel capillary strands interspersed therethrough having a greater capillary lift action than the felt of said sheeting material, said method including forming an elongate parallelepiped block from said sheeting material with said sheeting material oriented to dispose said strands in planes extending longitudinally of said block, slitting said block lengthwise thereof a substantial distance, and parallel to the planes of said strands, forming at least a part of the slit portion of said block to define a smoothly curving arc, and securing the slit portions together.

References Cited in the file of this patent

UNITED STATES PATENTS

| | | |
|---|---|---|
| 392,142 | Wright | Oct. 30, 1888 |
| 1,231,990 | Bliss | July 3, 1917 |
| 2,042,976 | Aalto | June 2, 1936 |
| 2,219,719 | Carlson | Oct. 29, 1940 |